United States Patent
Goossens et al.

(10) Patent No.: US 12,412,967 B2
(45) Date of Patent: Sep. 9, 2025

(54) SYSTEM AND METHOD FOR FILLING A BATTERY CELL WITH LIQUID ELECTROLYTE

(71) Applicant: Project Engineering and Contracting NV, Leuven (BE)

(72) Inventors: Raphael Jan J. Goossens, Rotselaar (BE); Louca Raphael Goossens, Aarschot (BE)

(73) Assignee: PROJECT ENGINEERING AND CONTRACTING NV, Leuven (BE)

( * ) Notice: Subject to any disclaimer, the term of this patent is extended or adjusted under 35 U.S.C. 154(b) by 115 days.

(21) Appl. No.: 18/193,925

(22) Filed: Mar. 31, 2023

(65) Prior Publication Data
US 2024/0332763 A1 Oct. 3, 2024

(51) Int. Cl.
| H01M 10/04 | (2006.01) |
| H01M 10/48 | (2006.01) |
| H01M 50/627 | (2021.01) |
| H01M 50/673 | (2021.01) |

(52) U.S. Cl.
CPC ..... *H01M 50/627* (2021.01); *H01M 10/0404* (2013.01); *H01M 10/484* (2013.01); *H01M 50/673* (2021.01)

(58) Field of Classification Search
CPC ............. H01M 50/673; H01M 10/484; H01M 10/0404; H01M 50/627
See application file for complete search history.

(56) References Cited

U.S. PATENT DOCUMENTS

| 5,731,099 A | 3/1998 | Badger et al. |
| 6,593,026 B1 * | 7/2003 | Tukawaki ........... H01M 50/627 429/185 |
| 2015/0162594 A1 * | 6/2015 | Watanabe ........... H01M 50/627 141/32 |
| 2017/0025714 A1 * | 1/2017 | Tsukui .............. H01M 10/0567 |

FOREIGN PATENT DOCUMENTS

| CN | 101465415 B | 12/2010 |
| CN | 102738438 B | 8/2014 |
| CN | 203883070 U | 10/2014 |
| CN | 107256944 A | 10/2017 |
| CN | 108011072 A | 5/2018 |
| CN | 108767189 A | 11/2018 |
| CN | 106784593 B | 5/2019 |
| JP | 5188730 B2 | 4/2013 |
| KR | 100477724 B1 | 5/2005 |
| KR | 101222324 B1 | 1/2013 |

OTHER PUBLICATIONS

Extended European Search Report from Corresponding European Patent Application No. EP23165939.2, Oct. 9, 2023.

* cited by examiner

*Primary Examiner* — Jason K Niesz
(74) *Attorney, Agent, or Firm* — Workman Nydegger

(57) ABSTRACT

A filling head assembly for filling a battery cell with a liquid electrolyte includes a filling head. The filling head includes a first and a second fluid channel and a valve. The inlet of the first fluid channel is connected to a pump. The inlet of the second fluid channel is connected to a vacuum pump. The outlet of the first fluid channel engages with a filling opening of the battery cell. The valve determines whether the outlet of the first fluid channel is connected to the inlet of the first fluid channel. The apparatus includes the filling head, to a production line comprising the apparatus and to a method for filling a battery cell with liquid electrolyte using the apparatus.

14 Claims, 5 Drawing Sheets

SYSTEM AND METHOD FOR FILLING A BATTERY CELL WITH LIQUID ELECTROLYTE

FIELD OF THE INVENTION

The present invention relates to the filling of battery cells with liquid electrolyte.

BACKGROUND

Many types of electrochemical devices employ porous electrodes and a liquid electrolyte. A classic lithium battery cell—featuring a composite metal-oxide cathode, a composite graphite anode, a separator and an electrolyte composed of an organic solvent and dissolved lithium salts—is the most well-known and ubiquitous example of such a device.

During manufacturing of a lithium battery cell, the electrodes and separator are first placed in the cell casing before the cell is filled with electrolyte and charged. This filling is a critical step in the manufacturing process for multiple reasons. First of all, the electrolyte needs to permeate all the voids in the porous electrodes to ensure that the cell achieves optimum energy density, power density and coulombic efficiency. Secondly, sufficient wetting of the porous electrodes is important to ensure a uniform solid-electrolyte interface (SEI) growth and to limit future degradation phenomena such as electrolyte decomposition and lithium dendrite formation. In third place, the wetting process needs to proceed as fast as possible because there are undesirable parasitic reactions which occur in the uncharged cell after filling with electrolyte; a long wetting time may lead to a loss of active material and electrolyte, while also creating nucleation sites for future lithium dendrite growth.

Current manufacturing practice uses a fixed volume piston to inject the electrolyte into cells with a hard casing, like cylindrical or prismatic cells, or pours a fixed volume of electrolyte into pouch cells. For smaller cell sizes, the dead volume of the cell can act as a buffer for the amount of electrolyte that does not instantly infiltrate the porous electrodes, leading to sufficiently fast filling of the cells. However, cell manufacturers are moving towards bigger cell formats due to the increased volumetric and gravimetric energy density of these larger cells. In larger cells, the dead volume is insufficiently large to accommodate the non-infiltrated electrolyte volume. Consequently, the electrolyte injection speed or pouring rate is determined by the rate at which the electrolyte infiltrates the porous electrodes. Without external influence, it takes a couple of hours for the electrolyte to sufficiently wet the porous electrodes, which is an unacceptably long period of time—both for the above mentioned technical reasons as well as for economical reasons. Therefore, three techniques are employed to enable cell filling to proceed at an acceptable rate.

First of all, cell filling is implemented as a batch process wherein a large number of cells are filled in parallel. Secondly, the cells are placed in a low vacuum environment to aid with the evacuation of the gases trapped inside the porous electrodes. In a batch process, this implies that the cells of a single batch are placed together in a vacuum chamber. In third place, cells are filled in multiple steps: in each step, a fixed volume of electrolyte is injected. In between steps, the cells are typically kept in a low vacuum, elevated temperature environment—where even pressure cycles may be applied—to enhance electrolyte wetting. Depending on the cell size and construction, two to three filling steps may be required—each step taking up to 30 minutes in time—with a vacuum wetting period of up to multiple hours (hours) between each filling step.

This filling process has many disadvantages associated to it. Firstly, because cells are filled in parallel, the slowest cell of the batch determines the filling speed of the entire batch. Consequently, a cell into which the electrolyte infiltrates particularly slowly can greatly prolong the filling process of the entire batch. In second place, because multiple cells are placed together in a vacuum chamber, electrolyte spilling from one cell soils all of the cells of the batch and cleaning, as well as the (frequently required) maintenance of even a single injection system, results in a standstill of the entire cell production line. Typically, this standstill time is as high as 2 to 4 hours a day. Thirdly, it takes a lot of energy to create an atmosphere with a sufficiently low vacuum and a sufficiently low dew point (to prevent electrolyte decomposition) in a batch processing chamber. Even then, the vacuum might not be low enough, leading to slow electrolyte infiltration or nefarious side reactions. Further, the vacuum wetting step requires a lot of floor space in the typically expensive and high energy consuming dry room ambient part of the manufacturing facility. Finally, even though the filling process can take multiple hours to complete, resulting in parasitic reactions in the meantime, it still does not achieve full wetting of the electrodes.

Therefore, there is still a need for an alternative and improved system and method for filling battery cells with liquid electrolyte.

SUMMARY

The present invention aims to remedy the above-mentioned and other disadvantages. Even though the remainder of the disclosure explicitly discusses the invention in the context of battery cells, the skilled person will appreciate that the present invention is applicable to other types of electrochemical cells employing a liquid electrolyte.

According to a first aspect of the invention, a filling head assembly for filling a battery cell with a liquid electrolyte is disclosed, the filling head assembly comprising a filling head;
   wherein the filling head comprises a first and a second fluid channel and a valve;
   wherein each of both channels comprises an inlet and an outlet;
   wherein the inlet of the first fluid channel is adapted to be connected to a pump;
   wherein the inlet of the second fluid channel is adapted to be connected to a vacuum pump;
   wherein the outlet of the first fluid channel is adapted to engage with a filling opening of the battery cell;
   wherein the outlet of the second fluid channel is on a same side of the filling head as the outlet of the first fluid channel;
   wherein the valve is positioned such that the first fluid channel is blocked when the valve is in a first position and such that the first fluid channel is open when the valve is in a second position.

Preferably, the filling head is manufactured from a material that is compatible with the liquid electrolyte. Alternatively, the interior of the first fluid channel may be coated with a material that is compatible with the liquid electrolyte. Preferably, the filling head is manufactured from a material that does not display substantial outgassing under low vacuum conditions. Alternatively, the interior of the first and second fluid channel may be coated with a material that does not display substantial outgassing under low vacuum conditions. A suitable material for the filling head is for instance austenitic stainless steel.

The filling head assembly serves as a fluid connection between the vacuum pump and the battery cell and between the pump and the battery cell. The valve ensures that the first fluid channel can be blocked, thereby blocking electrolyte flow, when the vacuum pump is operated.

It is an advantage of the filling head assembly that the volume in which the pressure needs to be reduced is very small when compared to a typical state-of-the art batch processing chamber. This ensures that lower pressures can be reached, in much shorter amounts of time and with much lower energy expenditure.

It is an additional advantage of the filling head assembly that electrolyte spill-over, during and after filling can be prevented.

In some embodiments of the filling head assembly, the filling head further comprises a third fluid channel, wherein the third fluid channel is adapted to provide a control input to the valve. For instance, the valve may be controlled pneumatically or hydraulically and the third fluid channel may function as a pneumatic or hydraulic tube or may comprise one or more pneumatic or hydraulic tubes. Alternatively, the valve may be controlled electrically and the third fluid channel may comprise one or more electrical wires. Irrespective of how the valve is controlled, the valve may be equipped with a position sensor and the third fluid channel may comprise electrical wiring for the sensor's signals.

In some embodiments of the filling head assembly, the filling head assembly further comprises a casing;
- wherein the filling head is movably mounted in the casing;
- wherein the casing comprises one or more openings to allow fluid access to the fluid channels in the filling head;
- wherein an end face of the casing comprises one of the openings and is adapted to engage with an end face of the battery cell, the battery cell end face comprising the filling opening;
- wherein the outlet of the first fluid channel is distanced from the filling opening when the filling head is in a first position in the casing and the outlet of the first fluid channel extends through the opening in the casing end face and into the filling opening when the filling head is in a second position in the casing.

In some embodiments of the filling head assembly, the filling head assembly further comprises a first seal mounted on a casing end face;
- wherein the inner diameter of the first seal is superior to the diameter of the opening in the casing end face;
- wherein the first seal is positioned substantially concentrically with the opening in the casing end face;
- wherein the inner diameter of the first seal is superior to the diameter of the filling opening;
- wherein the first seal is positioned substantially concentrically with the filling opening when the casing end face engages with the battery cell end face;
- wherein the first seal provides a seal between the casing end face and the battery cell end face when the casing end face engages with the battery cell end face.

Preferably, the seal is chemically inert in contact with the liquid electrolyte. Alternatively, the seal may be chemically resistant in contact with the liquid electrolyte. The seal may be standard O-ring or X-ring seal. Alternatively, the seal may have a custom cross-section and/or a custom shape. For example, the electrolyte filling opening may be of rectangular shape or may be located in a rectangular emboss. In such a case, it might be preferable if the seal is of rectangular shape.

The purpose of the seal is to separate the atmosphere inside the battery cell and the fluid channels from the surrounding atmosphere. It is an advantage of such a separation that the volume inside of which the pressure should be reduced, is decreased. This implies that less energy is required to reduce the pressure, and that the pressure reduction is achieved in a shorter timeframe. To achieve this purpose, the seal should be able to withstand the pressure differential between the cell interior and the surrounding environment without suffering from significant air leakage.

In some embodiments of the filling head assembly, the filling head is slidably mounted in the casing such that it can move from the first position to the second position or the second position to the first position.

In some embodiments of the filling head, the filling head is slidably mounted in the casing such that it can move between more than two positions in the casing.

The movement of the filling head may be purely linear or may comprise an additional rotational component. The movement may be passively controlled by one or more guiding surfaces or ribs and/or actively controlled by means of a mechanism such as for instance a cam.

It is an advantage of these embodiment that each of the positions may be optimized for certain tasks in the electrolyte filling process.

It is an additional advantage of these embodiments that the movement of the filling head may be used to operate other actuation mechanisms. For instance, movement of the filling head may operate the valve.

In some embodiments of the filling head assembly, the filling head further comprises a second seal mounted on a filling head end face:
- wherein the inner diameter of the first seal is superior to the outer diameter of the second seal;
- wherein the second seal is positioned substantially concentrically with the first seal;
- wherein the inner diameter of the second seal is superior to the diameter of the outlet of the first fluid channel;
- wherein the second seal is positioned substantially concentrically with the outlet of the first fluid channel;
- wherein the inner diameter of the second seal is superior to the diameter of the filling opening;
- wherein the second seal is positioned substantially concentrically with the filling opening when the filling head end face engages with the battery cell end face;
- wherein the second seal provides a seal between the filling head end face and the battery cell end face when the filling head end face engages with the battery cell end face.

Preferably, the seal is chemically inert in contact with the liquid electrolyte. Alternatively, the seal may be chemically resistant in contact with the liquid electrolyte. The seal may be standard O-ring or X-ring seal. Alternatively, the seal may have a custom cross-section and/or a custom shape. For example, the electrolyte filling opening may be of rectangular shape or may be located in a rectangular emboss. In such a case, it might be preferable if the seal is of rectangular shape.

The purpose of the second seal is to separate the atmosphere inside the battery cell and the fluid channels from the volume between the filling head, casing and battery cell during electrolyte injection into the battery. It is an advantage of such a separation that liquid electrolyte cannot be spilled inside the filling head assembly or on the exterior surface of the battery cell. This implies that downtime and wear due to electrolyte spilling is significantly reduced. To achieve this purpose, the seal should be able to withstand the pressure differential between the cell interior—which might be at higher than atmospheric pressure during electrolyte injection—and the surrounding volume—which might be at low vacuum pressure.

In some embodiments of the filling head assembly, the filling head further comprises a fourth fluid channel:
- wherein the fourth fluid channel comprises an inlet and an outlet;
- wherein the inlet of the fourth fluid channel is adapted to be connected to a gas supply system;
- wherein the outlet of the fourth fluid channel is arranged concentrically around the outlet of the first fluid channel.

The fourth fluid channel may provide a shielding gas concentrically with the first fluid channel when the outlet of the first fluid channel disengages from the filling opening or when the filling head assembly disengages from the battery cell. The shielding gas may protect the battery from moisture infiltration between the electrolyte filling and cell sealing steps such that the filling does not necessarily need to happen in a dry room.

According to a second aspect of the invention, an apparatus for filling a battery cell with a liquid electrolyte is disclosed, the apparatus comprising:
- a filling head assembly according to the first aspect of the invention;
- an electrolyte reservoir, configured to hold the liquid electrolyte;
- a pump, wherein an outlet of the pump is fluidly connected to the inlet of the first fluid channel of the filling head, wherein an inlet of the pump is fluidly connected to the electrolyte reservoir and wherein the pump is adapted to pump the liquid electrolyte;
- a vacuum pump, wherein an outlet of the vacuum pump is fluidly connected to the inlet of the second fluid channel of the filling head, and wherein the vacuum pump is adapted to reduce the pressure in the second fluid channel, the first fluid channel and the battery cell below a predetermined pressure threshold;
- means for fixing the battery cell in a position wherein the outlet of the first fluid channel can engage with a filling opening of the battery cell and/or wherein the casing end face can engage with the battery cell end face and/or wherein the filling head end face can engage with the battery cell end face. Preferably, the liquid electrolyte is held in the electrolyte reservoir under an inert gas blanket.

In some embodiments of the apparatus, the apparatus further comprises a first actuator for moving the fixated battery cell. The first actuator may move the fixated battery cell from a position wherein the casing end face is not engaged with the end face of the battery cell to a position wherein both end faces are engaged with one another and vice versa. Preferably, the first actuator translates the battery cell assembly along a linear trajectory.

In some embodiments of the apparatus, the apparatus comprises a second actuator for moving the filling head in the casing from a position wherein the outlet of the first fluid channel is not engaged with the filling opening of the battery cell to a position wherein both are engaged and vice versa.

In some embodiments of the apparatus, the apparatus further comprises:
- means for measuring a quantity of liquid electrolyte with which the battery cell has been filled;
- means for controlling the pump.

By measuring the quantity of liquid with which the battery has already been filled, feedback can be provided to a pump controller. This enables more precise control of the filling, leading to faster fill times and a lower chance of electrolyte spilling.

The means for controlling the pump may be for instance a PID controller, a state feedback controller or any other suitable type of control algorithm known to the skilled person.

In some embodiments of the apparatus, the means for measuring a quantity is a weight sensor that weighs the battery cell.

Preferably, the weight sensor is mounted to the fixing means in such a way that it supports the entire weight of the battery cell once the cell is fixated by the apparatus.

An advantage of using a weight sensor over using a flow sensor is that weight sensors are far more accurate than flow sensors. An additional advantage is that weight sensors are mechanically less complex and cheaper than flow sensors. An additional advantage is that a weight sensor does not need to come into contact with the liquid electrolyte.

In some embodiments of the apparatus, the pump is a positive displacement pump.

An advantage of using a positive displacement pump instead of a non-positive displacement pump is that the volume of pumped electrolyte—or mass, in case the electrolyte behaves as an incompressible fluid—can be directly deduced from the displacement of the pump's rotor. It is an additional advantage that positive displacement pumps are more efficient and easier to control than centrifugal or axial-flow pumps at low flow rates. In addition, the positive displacement pump may act as a valve, thereby negating the need for a separate dedicated valve in the filling head assembly.

In some embodiments of the apparatus, the positive displacement pump is a progressing cavity pump.

It is an advantage of using a progressing cavity pump that the output flow of a progressing cavity pump has very little to no pulsation. It is an additional advantage that a progressing cavity pump can be operated in the reverse direction to suck back excess electrolyte. It is an additional advantage that a positive displacement pump has a linear pressure characteristic.

In some embodiments of the apparatus, the pump comprises a motor encoder.

It is an advantage of using a motor encoder that the angular position of the pump can be determined with high resolution and high accuracy. Due to the inherent relation in a positive displacement pump between pump rotation and displaced volume of fluid, the electrolyte flow can be controlled very precisely.

In some embodiments of the apparatus, a first pressure sensor is located at the inlet of the pump.

In some embodiments of the apparatus, a second pressure sensor is located at the outlet of the pump or inside the first fluid channel.

In some embodiments of the apparatus, a third pressure sensor is located at the outlet of the vacuum pump or inside the second fluid channel.

It is an advantage of using pressure sensors that these may provide additional feedback inputs for the control of the pump and/or vacuum pump.

In some embodiments of the apparatus, a second valve is located between the outlet of the vacuum pump and the inlet of the second fluid channel.

It is an advantage of these embodiments that the second valve may be employed to return the internal volume of the filling head assembly to the pressure of the surroundings, which might be required to disengage the battery cell from the filling head assembly.

According to a third aspect of the invention, a production line for filling battery cells with liquid electrolyte is disclosed, the production line comprising an apparatus according to the second aspect of the invention and an automated actuator;
  wherein the automated actuator is configured to position a battery cell that is not filled with electrolyte and place it in the apparatus;
  wherein the apparatuses is configured to fill the battery cell with liquid electrolyte;
  wherein the automated actuator is configured to remove the battery cell from the apparatus once it has been filled.

Filling a battery cell with liquid electrolyte typically takes much longer than picking up and moving a battery cell. Hence, a production line may comprise less automated actuators than filling apparatuses. For instance, one automated actuator may provide/remove the battery cells to/from up to 24 filling apparatuses. The skilled person understands that the optimum amount of filling apparatuses per automated actuator depends on the expected filling time of the battery cells, and hence on the cell type and size.

In some embodiments of the production line, the one or more apparatuses are organized in a modular fashion. Preferably, this modular arrangement comprises one or more modular slides, one or more cages—mechanical frames into which the filling apparatuses are placed—and one or more airlocks. For instance, a modular installation may comprise an airlock that can open on both ends. At one side of the airlock may be a dry room environment, on the other side the ambient environment. Inside the airlock one or more cages may be installed. Each of the cages comprises one or more filling apparatuses. These filling apparatuses are preferably installed on a movable slide in the cage. For instance, the aforementioned filling apparatuses can be organized in 4 cages, each cage holding 6 apparatuses which are placed in pairs on a movable slide.

It is an advantage of this embodiment that the apparatuses can move between two or more distinct positions. For instance, a first position may correspond to normal functioning of an apparatus. Thus, when an apparatus is in the first position, the automated actuator may provide the apparatus with a battery cell. A second position may correspond to a maintenance or calibration position and when in that position, the automated actuator may not provide the apparatus with battery cells. For instance, to perform maintenance on a single filling apparatus, the dry-room side of the airlock is closed. Subsequently, the ambient-side of the airlock is opened and the filling apparatus-mounted on the movable slide is retracted from the airlock. Once the concerned filling apparatus (or the concerned pair) is outside the airlock for maintenance, the ambient-side may be closed and the dry-room side may be reopened such that the remaining filling apparatuses can continue operation under a conditioned atmosphere. This might enable the intervention of a human operator for the maintenance or repair of an apparatus, without the need for the operator to enter the room in which the battery cells are filled. This reduces the risk of contamination of the cells and reduces the safety risk for the human operator.

In addition, since each filling apparatus is individually controlled, the apparatuses that are not undergoing maintenance are still functioning and may still be kept in the dry atmosphere. This guarantees that the cell filling process does not come to a halt, even during maintenance or when a malfunction or electrolyte spillage has occurred.

According to a fourth aspect of the invention, a method for filling a battery cell with a liquid electrolyte using an apparatus according to the second aspect of the invention is disclosed, the method comprising the steps of:
  positioning the battery cell;
  engaging the outlet of the first fluid channel with the filling opening of the battery cell or engaging the casing end face with the battery end face;
  optionally, operating the pump in reverse direction to suck back any electrolyte that might have remained in the first fluid channel;
  placing the valve in the first position, thereby blocking the first fluid channel;
  operating the vacuum pump to reduce the pressure in the second fluid channel, the first fluid channel and the battery cell to below a predetermined pressure threshold;
  optionally, if in step (b) the casing end face has engaged with the battery end face, bringing the filling head in the second position in the casing, thereby extending the outlet of the first fluid channel into the filling opening of the battery cell;
  placing the valve in the second position;
  operating the pump to fill the battery cell with the liquid electrolyte;
  equalizing the pressure in the first fluid channel, second fluid channel and the battery cell with the environmental pressure;
  optionally, if in step (e) the filling head has been brought in the second position in the casing, bringing the filling head in the first position in the casing;
  disengaging the outlet of the first fluid channel with the filling opening of the battery cell or disengaging the casing end face with the battery end face;
  removing the battery cell.

In some embodiments of the method, the method further comprises the step of reversing the pump after filling the battery cell with the liquid electrolyte.

The step of reversing the pump may serve multiple purposes. Reversing the pump may normalize the pressure inside the battery cell, which may have increased due to the pumping action. Preferably, the battery is overfilled with reverse electrolyte to compensate for the electrolyte volume that is removed during reverse operation of the pump. Alternatively, reversing the pump may also suck back excess electrolyte to avoid soiling of the battery cell or the filling head assembly once the outlet of the first fluid channel disengages from the filling opening. Optionally, the valve is placed in the first position after the step of reversing the pump to avoid electrolyte spillage.

In some embodiments of the method, the method further comprises the steps of:
  during the filling of the battery cell with the liquid electrolyte, periodically measuring the quantity of electrolyte with which the battery cell has been filled; and
  controlling the pump to ensure the proper filling of the battery cell.

In some embodiments of the method, the method further comprises the steps of:

during the filling of the battery cell with the liquid electrolyte, periodically measuring the pressure at the outlet of the pump and/or inside the first fluid channel and/or at the outlet of the first fluid channel; and controlling the pump to ensure that a pressure setpoint is maintained or not exceeded.

In some embodiments of the method, the method further comprises the step of calibrating the pump. Such a calibration may for instance involve a simultaneous measurement of the weight of the electrolyte that has been actually pumped into the cell—which might be done by measuring the cell before and after filling—and of the amount of electrolyte that has been pumped according to the pump model and/or pump sensors. Based on these measurements, the deviation between the measured filling weight and the estimated filling amount can be tracked over time and the parameters of the control algorithm can be adjusted to compensate for wear, tolerances and environmental influences.

This calibration may occur for every cell or periodically. Possible triggers for the initiation of the calibration process may for instance be the lapse of a predetermined number of filling cycles, a predetermined filling volume, the detection of a deviation by the controller or human intervention. The sample frequency for the calibration procedure may be adjusted.

DETAILED DESCRIPTION

Figure 1A:
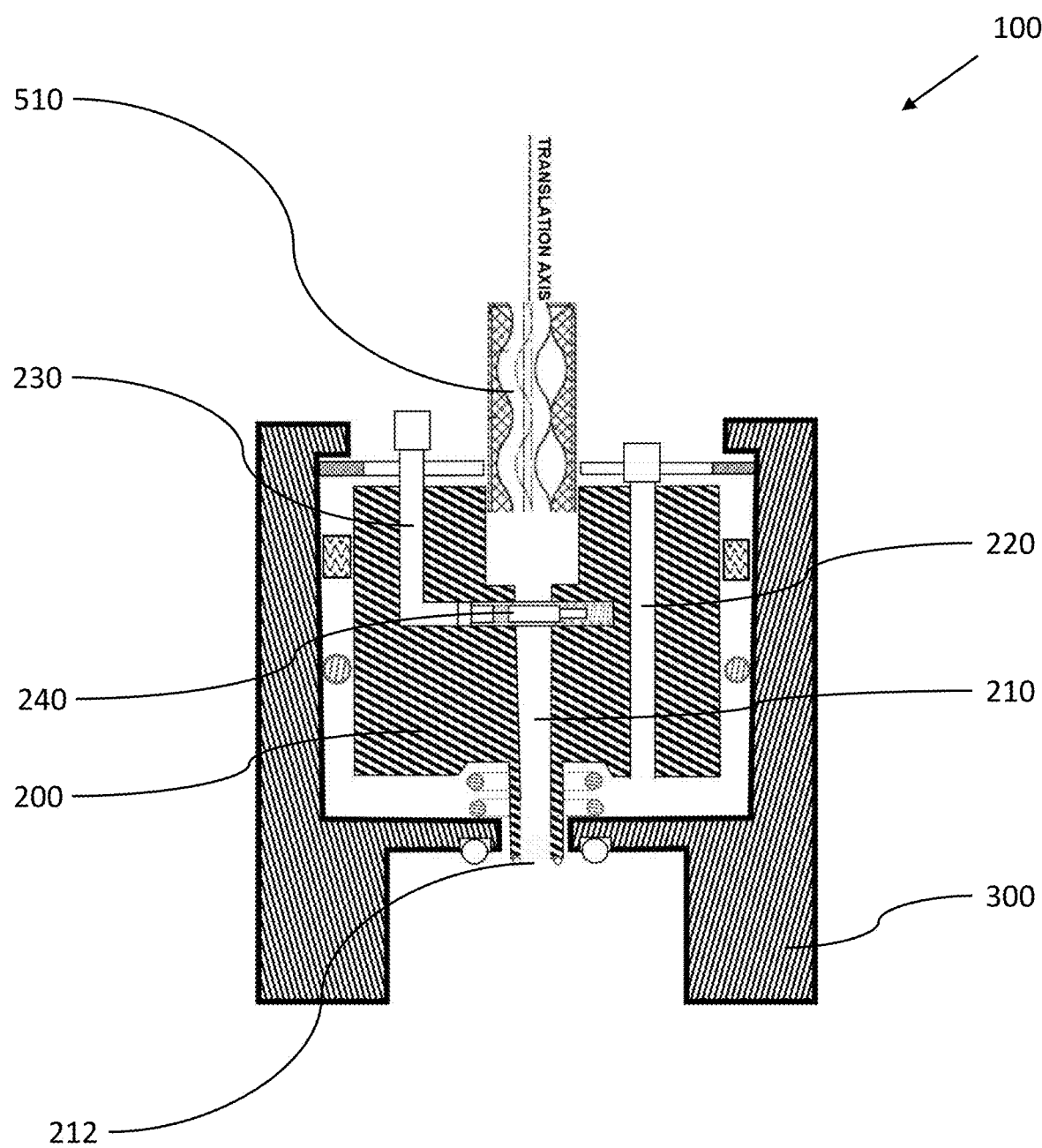
FIGS. 1a-d schematically illustrate an embodiment of a filling head assembly according to the present invention.

The present disclosure will be described in terms of specific embodiments, which are illustrative of the disclosure and which are not to be construed as limiting. It will be appreciated that the present disclosure is not limited by what has been particularly shown and/or described and that alternatives or modified embodiments could be developed in the light of the overall teaching of this disclosure. The drawings described are only schematic and are non-limiting.

Reference throughout this description to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Specific features, structures or characteristics are indicated in the figures by reference numerals. In order not to overload the figures, not every feature is indicated in every figure. Conversely, in order not to overload the text, not every feature indicated in a figure is also discussed in the context of this particular figure.

Finally, the use of ordinal numbers such as "first", "second" and the like throughout this disclosure in no way implies a hierarchical relationship—not in terms of importance, position or time—between the features with which they are used, unless explicitly stated to the contrary. These ordinal numbers serve only to differentiate between different but similar features, properties, or structures.

FIG. 1a schematically illustrates an embodiment of a filling head assembly 100 according to the present invention. The assembly comprises a filling head 200 which is movably mounted inside a casing 300. In the embodiment of FIG. 1a, the filling head 200 sits in a first position in the casing 300.

The filling head 200 comprises a first fluid channel 210, a second fluid channel 220 and a third fluid channel 230. The inlet of the first fluid channel 210 is connected to the outlet of the pump 510. The inlet of the second fluid channel 220 is connected to the outlet of a vacuum pump (not shown in FIG. 1a). The valve 240 is situated between the pump 510 and the outlet 212 of the first fluid channel 210. In the embodiment of FIG. 1a, the valve 240 is in a first position such that the first fluid channel 210 is blocked.

Figure 1B:
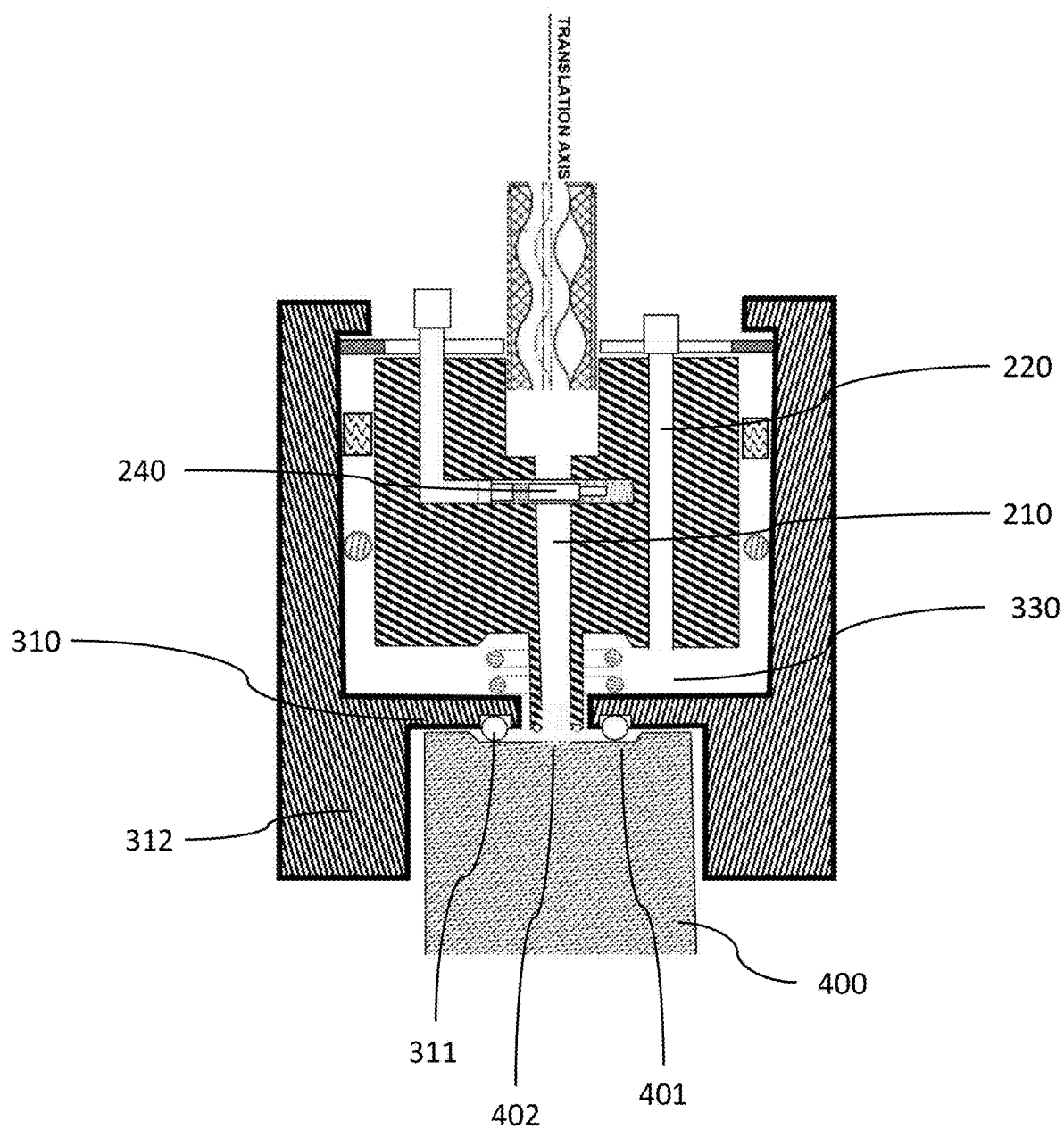

FIG. 1b schematically illustrates how the end face 310 of the casing 300 engages with the end face 401 of the battery cell 400. Preferably, this engagement occurs due to a first actuator (not shown in the figure) that is connected to the means for fixing the cell (not shown in the figure) moving the battery cell 400 towards the filling head assembly. Preferably, this first actuator is a linear actuator. Preferably, the first actuator is configured to move the battery cell between two positions: one position where the cell is not engaged with the filling head assembly and another position where the cell is engaged with the filling head assembly. Preferably the movement of the battery cell is a translation. Alternatively, this engagement may occur due to a second actuator (not shown in the figure) moving the filling head assembly towards the battery cell. The casing comprises a funnel 312 which ensures that the battery cell 400 is centered upon engagement and kept into place with respect to the filling head assembly. The first seal 311 is compressed between the casing end face 310 and the battery end face 401 and surrounds the filling opening 402 of the battery cell 400 and the opening in the casing.

In the situation illustrated in FIG. 1b, the valve 240 is still in the first position. In this situation, the vacuum pump can be operated to reduce the pressure inside the battery cell 400 to below a predetermined pressure threshold. Such a pressure reduction reduces the amount of gas trapped inside the porous electrodes of the battery cell, which enables faster electrolyte infiltration into those electrodes. Preferably, the pressure in the battery cell is reduced to a low vacuum level. For instance, the pressure might be reduced to below 50 mbar. Inevitably, to reduce the pressure inside of the battery cell 400, the pressure inside the first and second fluid channel and inside the void 330 between the filling head 200 and the casing 300 needs to be reduced as well. The first seal 311 should be capable of withstanding the pressure difference between the surroundings of the battery cell and the filling head assembly—which will generally be at atmospheric pressure—and the interior of the battery cell and the filling head assembly—which will be at low vacuum pressure.

Figure 1C:
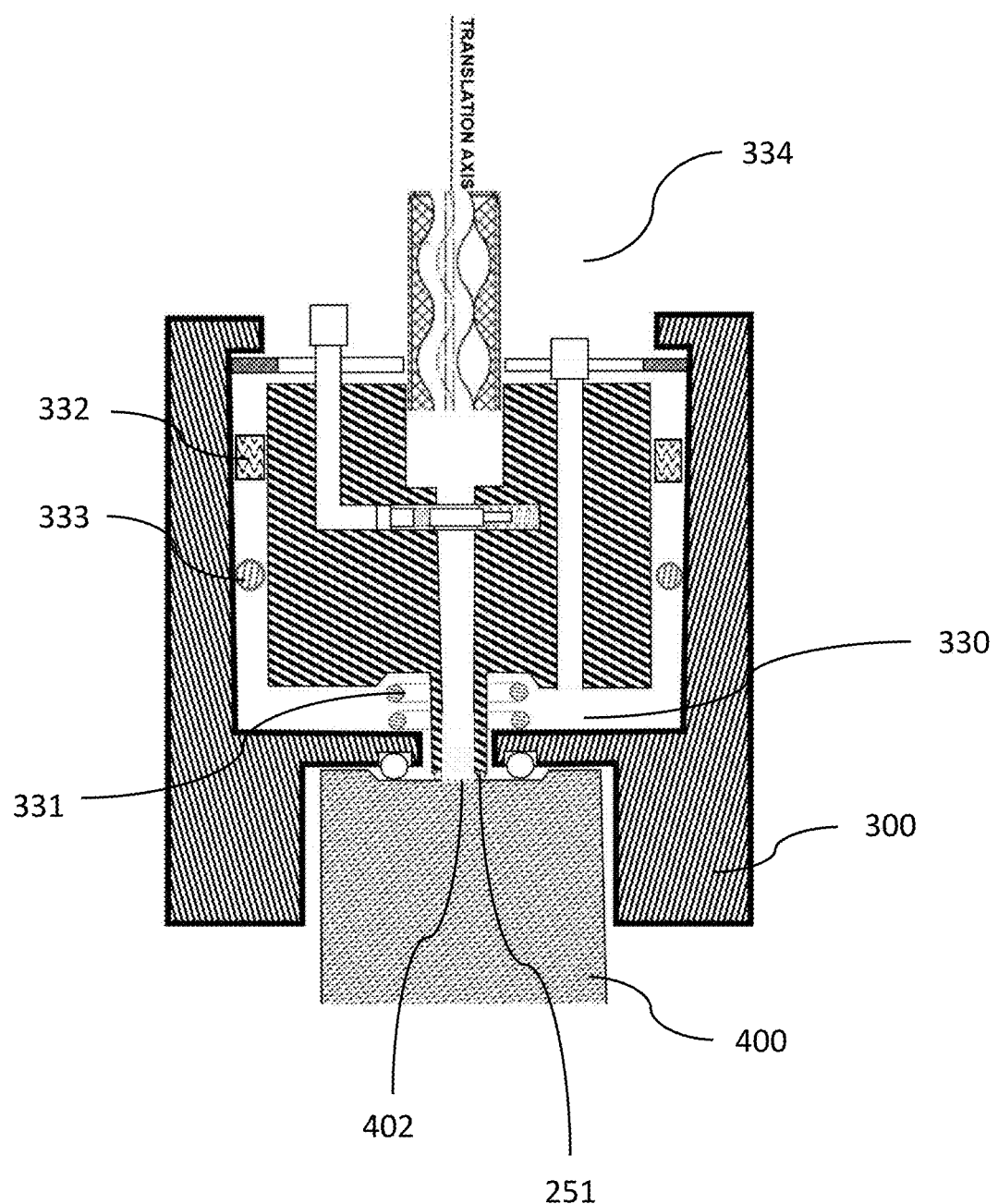

In the situation illustrated in FIG. 1c, the filling head 200 sits in a second position in the casing 300. Preferably, the transition from the first position to the second position of the filling head and vice versa is controlled by a second actuator (not shown in the figure) that is fixedly connected to the filling head and the compression spring 331. The compression spring 331 is mounted such that it can bring the filling head 200 in the first position in the casing 300, whereas the second actuator is designed such that the second actuator can bring the filling 200 in the second position in the casing by operating against the force exerted by the spring. The actuator may be a pneumatic, hydraulic or electro-mechanical actuator of any known type. The movement of the filling head 200 in the casing 300 is restricted and guided by the guiding surfaces 332. The allowed movement may be purely linear, or may have an additional rotational component. The third seal 333 seals the lateral contact surface between the filling head 200 and the casing 300 and, together with the first seal 311, ensures that the low vacuum pressure is maintained.

When the filling head 200 is in the second position, the outlet of the first fluid channel extends into the filling opening 402 of the battery cell. The second seal 251, which surrounds the outlet of the first fluid channel, is compressed between the end face of the filling head and the end face of the battery cell. The primary purpose of the second seal is to ensure that no electrolyte is spilled during the cell filling process.

Figure 1D:
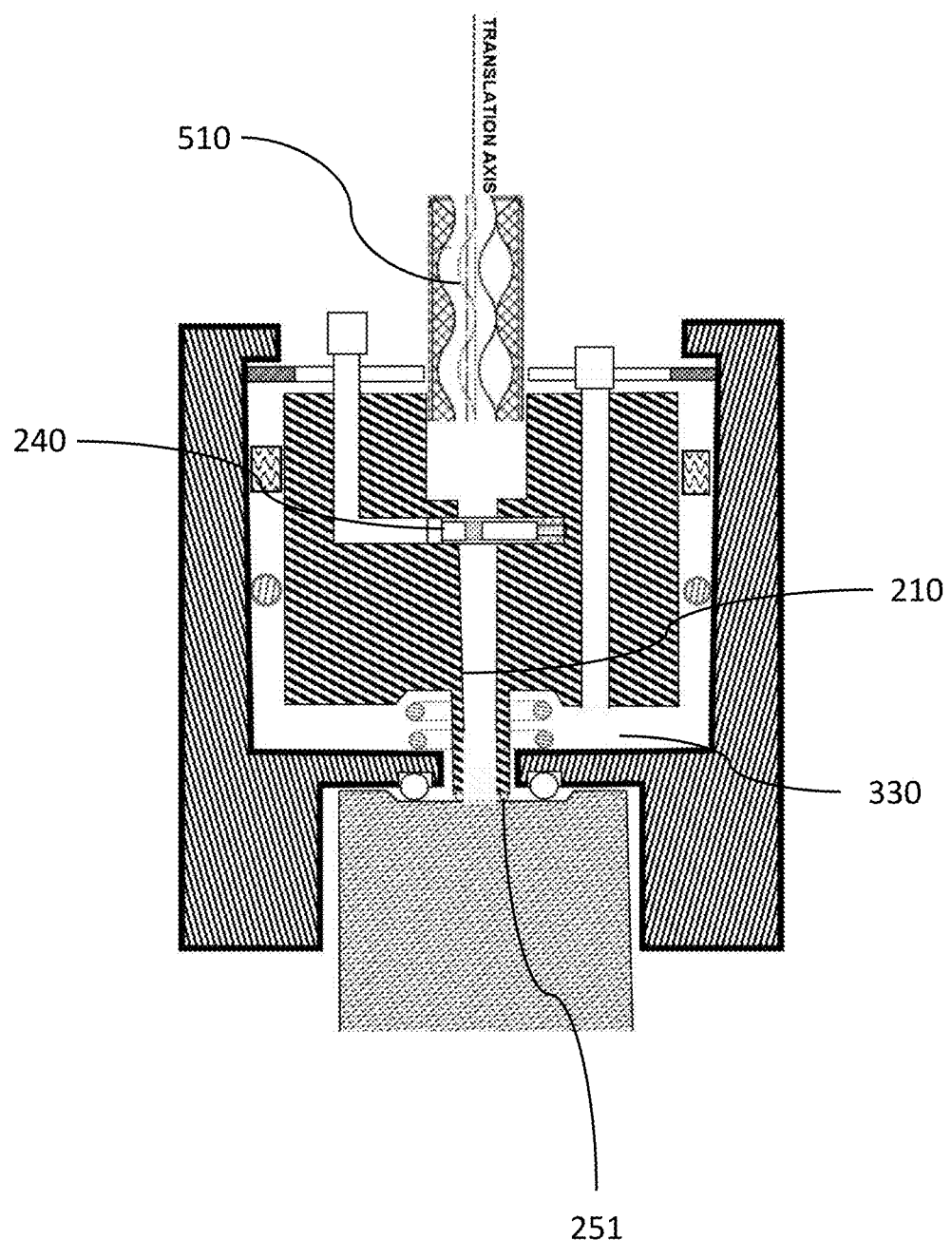

In FIG. 1d, the valve 240 is placed in its second position. In this position, the pump 510 is fluidly connected with the outlet of the first fluid channel 210. By operating the pump, the liquid electrolyte can be injected into the battery cell. Due to the presence of the second seal 251, liquid electrolyte cannot be spilled. The second seal 251 should be capable of withstanding the pressure difference between the inside of the battery cell and the first fluid channel—where the pressure may increase due to the filling process—and the volume 330 which may still be at low vacuum pressure.

Figure 2:
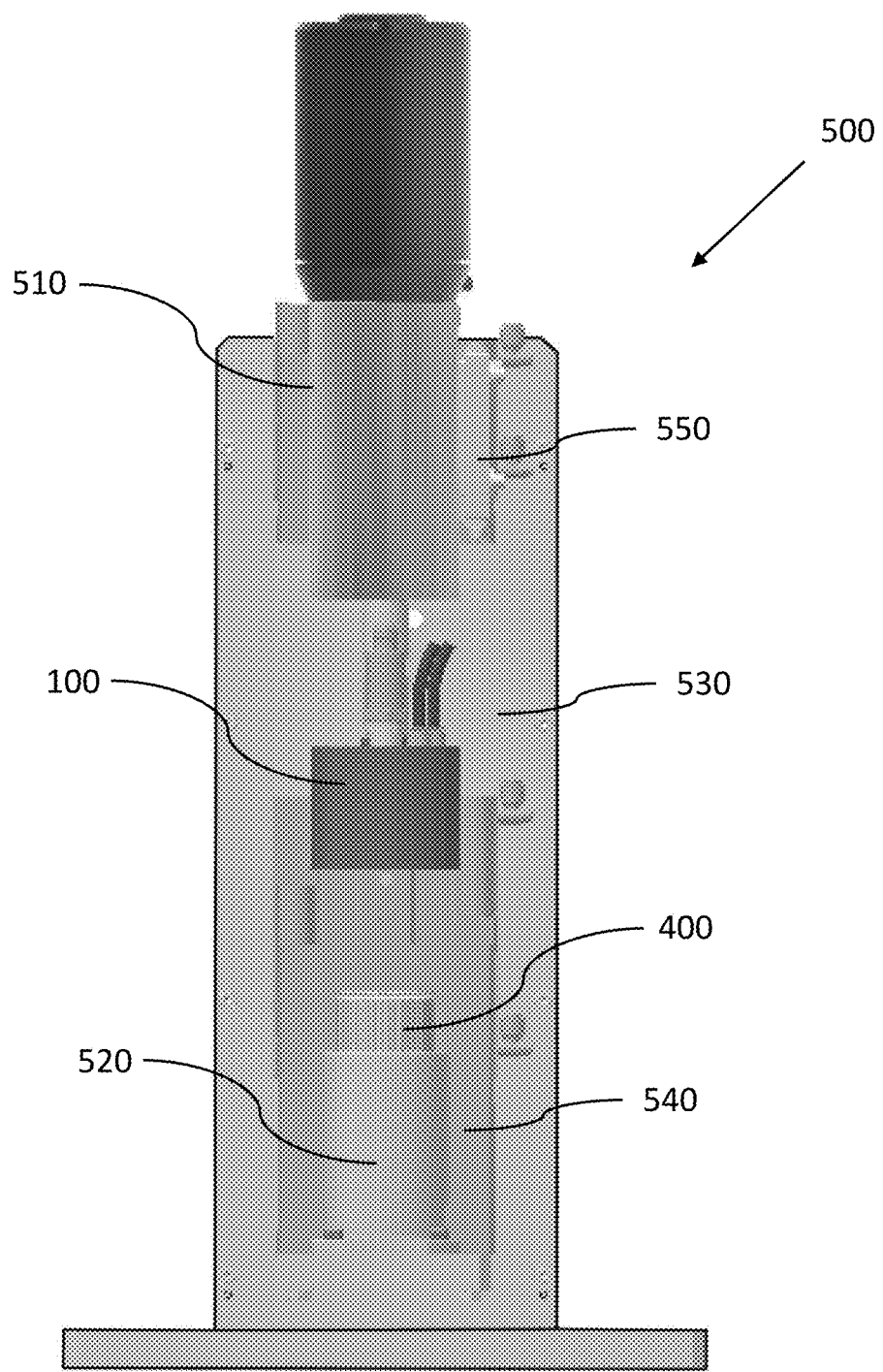
FIG. 2 schematically illustrates an embodiment of an apparatus according to the present invention.

FIG. 2 schematically illustrates an embodiment of an apparatus according to the present invention. The apparatus 500 comprises a filling head assembly 100 and a pump 510. The pump 510 is fixedly mounted to the filling head that is part of the filling head assembly. A second actuator 550 is fixedly attached to the pump and filling head and connects these parts to the upright 530. The apparatus further comprises means for fixing a battery cell 520. In the embodiment of FIG. 2, the means for fixing is a holder which restricts the downward or lateral translation of the battery cell, but does not exert a clamping force on the cell. A first actuator 540 is fixedly attached to the means for fixing and connects this part to the upright 530.

During operation, a battery cell 400 is placed in the means for fixing 520. The first actuator 540 can move this battery cell upwards to engage with the filling head assembly. The second actuator 550 can move the filling head with the pump downwards to engage with the filling opening of the battery cell.

| Reference signs | |
|---|---|
| 100 | filling head assembly |
| 200 | filling head |
| 210 | first fluid channel |
| 220 | second fluid channel |
| 230 | third fluid channel |
| 240 | valve |
| 251 | second seal |
| 300 | casing |
| 310 | casing end face |
| 311 | first seal |
| 312 | funnel |
| 330 | void |
| 331 | spring |
| 332 | guides |
| 333 | third seal |
| 400 | battery cell |
| 401 | battery cell end face |
| 402 | battery cell filling opening |

| Reference signs | |
|---|---|
| 500 | apparatus |
| 510 | pump |
| 520 | fixing means |
| 530 | upright |
| 540 | first actuator |
| 550 | second actuator |

The invention claimed is:

1. A filling head assembly for filling a battery cell with a liquid electrolyte, the filling head assembly comprising a filling head;
wherein the filling head comprises a first and a second fluid channel and a valve;
wherein each of both fluid channels comprises an inlet and an outlet;
wherein the inlet of the first fluid channel is adapted to be connected to a pump;
wherein the inlet of the second fluid channel is adapted to be connected to a vacuum pump;
wherein the outlet of the first fluid channel is adapted to engage with a filling opening of the battery cell;
wherein the outlet of the second fluid channel is on a same side of the filling head as the outlet of the first fluid channel;
wherein the valve is positioned such that the first fluid channel is blocked when the valve is in a first position and such that the first fluid channel is open when the valve is in a second position;
the filling head assembly further comprising a casing;
wherein the filling head is movably mounted in the casing;
wherein the casing comprises one or more openings to allow fluid access to the fluid channels of the filling head;
wherein an end face of the casing, the casing end face comprising one of the openings, is adapted to engage with an end face of the battery cell, the battery cell end face comprising the filling opening;
wherein the outlet of the first fluid channel is distanced from the filling opening when the filling head is in a first position in the casing and the outlet of the first fluid channel extends through the opening in the casing end face and into the filling opening when the filling head is in a second position in the casing.

2. The filling head assembly according to claim 1, the filling head assembly further comprising a first seal mounted on the casing end face;
wherein the inner diameter of the first seal is superior to the diameter of the opening in the casing end face;
wherein the first seal is positioned substantially concentrically with the opening;
wherein the inner diameter of the first seal is superior to the diameter of the filling opening;
wherein the first seal is positioned substantially concentrically with the filling opening when the casing end face engages with the battery cell end face;
wherein the first seal provides a seal between the casing end face and the battery cell end face when the casing end face engages with the battery cell end face.

3. The filling head assembly according to claim 1, wherein the filling head is slidably mounted in the casing such that it can move from the first position to the second position or the second position to the first position.

4. The filling head assembly according to claim 3, the filling head assembly further comprising a spring, wherein the spring is mounted between the filling head and the casing.

5. The filling head assembly according to claim 1, the filling head assembly further comprising a second seal mounted on a filling head end face:
- wherein the inner diameter of the first seal is superior to the outer diameter of the second seal;
- wherein the second seal is positioned substantially concentrically with the first seal;
- wherein the inner diameter of the second seal is superior to the diameter of the outlet of the first fluid channel;
- wherein the second seal is positioned substantially concentrically with the outlet of the first fluid channel;
- wherein the inner diameter of the second seal is superior to the diameter of the filling opening;
- wherein the second seal is positioned substantially concentrically with the filling opening when the filling head end face engages with the battery cell end face;
- wherein the second seal provides a seal between the filling head end face and the battery cell end face when the filling head end face engages with the battery cell end face.

6. An apparatus for filling a battery cell with a liquid electrolyte, the apparatus comprising:
- a filling head assembly according to claim 1;
- an electrolyte reservoir, configured to hold the liquid electrolyte;
- a pump, wherein an outlet of the pump is fluidly connected to the inlet of the first fluid channel of the filling head, wherein an inlet of the pump is fluidly connected to the electrolyte reservoir and wherein the pump is adapted to pump the liquid electrolyte;
- a vacuum pump, wherein an outlet of the vacuum pump is fluidly connected to the inlet of the second fluid channel of the filling head, and wherein the vacuum pump is adapted to reduce the pressure in the second fluid channel, the first fluid channel and the battery cell below a predetermined pressure threshold;
- means for fixing the battery cell in a position wherein the outlet of the first fluid channel can engage with a filling opening of the battery cell and/or wherein the casing end face can engage with the battery cell end face and/or wherein the filling head end face can engage with the battery cell end face.

7. The apparatus according to claim 6, the apparatus further comprising one or more actuators for changing the position of the filling head in the casing from a first position to a second position and/or from a second position to a first position and/or for changing the position of the battery cell from a first position to a second position and/or from a second position to a first position.

8. The apparatus according to claim 6, the apparatus further comprising:
- means for measuring a quantity of liquid electrolyte with which the battery cell has been filled;
- means for controlling the pump.

9. The apparatus according to claim 6, the apparatus further comprising a second valve between the outlet of the vacuum pump and the inlet of the second fluid channel.

10. A production line for filling battery cells with liquid electrolyte, the production line comprising an apparatus according to claim 6 and an automated actuator;
- wherein the automated actuator is configured to pick up a battery cell that is not filled with electrolyte and place it in the apparatus;
- wherein the apparatuses is configured to fill the battery cell with liquid electrolyte;
- wherein the automated actuator is configured to remove the battery cell from the apparatus once it has been filled.

11. A method for filling a battery cell with a liquid electrolyte using an apparatus according to claim 6, the method comprising the steps of:
- positioning the battery cell;
- engaging the outlet of the first fluid channel with the filling opening of the battery cell or engaging the casing end face with the battery end face;
- optionally, operating the pump in reverse direction to suck back any electrolyte that might have remained in the first fluid channel;
- placing the valve in the first position, thereby blocking the first fluid channel;
- operating the vacuum pump to reduce the pressure in the second fluid channel, the first fluid channel and the battery cell to below a predetermined pressure threshold;
- optionally, if in step (b) the casing end face has engaged with the battery end face, bringing the filling head in the second position in the casing, thereby extending the outlet of the first fluid channel into the filling opening of the battery cell;
- placing the valve in the second position;
- operating the pump to fill the battery cell with the liquid electrolyte;
- equalizing the pressure in the first fluid channel, the second fluid channel and the battery cell with an environmental pressure;
- optionally, if in step (e) the filling head has been brought in the second position in the casing, bringing the filling head in the first position in the casing;
- disengaging the outlet of the first fluid channel with the filling opening of the battery cell or disengaging the casing end face with the battery end face;
- removing the battery cell.

12. The method according to claim 11, the method further comprising the step of reversing the pump after filling the battery cell with the liquid electrolyte.

13. The apparatus according to claim 6, wherein the pump is a positive displacement pump.

14. The apparatus according to claim 13, wherein the pump is a progressing cavity pump.

* * * * *